United States Patent
Gohle et al.

(10) Patent No.: US 7,672,342 B2
(45) Date of Patent: Mar. 2, 2010

(54) METHOD AND RADIATION SOURCE FOR GENERATING PULSED COHERENT RADIATION

(75) Inventors: Christoph Gohle, Munich (DE); Theodor W. Hänsch, Munich (DE); Ronald Holzwarth, Bachnang (DE); Thomas Udem, Munich (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 136 days.

(21) Appl. No.: 11/136,106

(22) Filed: May 24, 2005

(65) Prior Publication Data

US 2006/0268949 A1    Nov. 30, 2006

(51) Int. Cl.
    *H01S 3/30* (2006.01)
(52) U.S. Cl. ............................. 372/5; 372/21
(58) Field of Classification Search .............. 372/5, 372/21, 22, 98, 99, 103, 108; 359/328, 329
    See application file for complete search history.

(56) References Cited

U.S. PATENT DOCUMENTS

| | | | | |
|---|---|---|---|---|
| 3,348,093 A | * | 10/1967 | Holly | 315/3 |
| 3,801,797 A | * | 4/1974 | Harris et al. | 359/329 |
| H66 H | * | 5/1986 | White | 372/5 |
| 5,164,857 A | * | 11/1992 | Lin | 359/583 |
| 5,835,513 A | * | 11/1998 | Pieterse et al. | 372/22 |
| 5,943,351 A | * | 8/1999 | Zhou et al. | 372/22 |
| 6,002,697 A | * | 12/1999 | Govorkov et al. | 372/34 |
| 6,031,854 A | * | 2/2000 | Ming | 372/22 |
| 6,038,055 A | | 3/2000 | Hänsch et al. | |
| 6,240,111 B1 | * | 5/2001 | Kubota et al. | 372/21 |
| 6,559,941 B1 | * | 5/2003 | Hammer | 356/319 |
| 2003/0205960 A1 | * | 11/2003 | Small | 313/325 |
| 2004/0146076 A1 | * | 7/2004 | Dudley et al. | 372/22 |
| 2004/1014607 | * | 7/2004 | Dudley et al. | 372/22 |
| 2004/0240493 A1 | * | 12/2004 | Uto et al. | 372/22 |

FOREIGN PATENT DOCUMENTS

DE    19750320 C1    1/1999

OTHER PUBLICATIONS

Paschotta et al., "Double-chiped semiconductor mirror for dispersion compensation in femtosecond lasers", Oct. 11, 1999, American Institute of Physics, Applied Physics Letters, 75, 15, 2166-2168.*

(Continued)

*Primary Examiner*—Minsun Harvey
*Assistant Examiner*—Joshua King
(74) *Attorney, Agent, or Firm*—Drinker Biddle & Reath LLP

(57) ABSTRACT

A method of generating pulsed coherent radiation, comprises the step of generating high harmonic pulses by an interaction of laser light pulses with a non-linear medium contained in a resonant cavity, wherein the non-linear medium is arranged in an environment of reduced pressure. Furthermore, a radiation source of generating pulsed coherent radiation is described, comprising a laser pulse source for generating laser light pulses, a resonant cavity including a non-linear medium for generating high harmonic pulses by an interaction of the laser light pulses with the non-linear medium, wherein the non-linear medium is arranged in an environment of reduced pressure.

31 Claims, 3 Drawing Sheets

OTHER PUBLICATIONS

Jones et al., "Phase-Coherent Frequency Combs in the Vacuum Ultraviolet via High-Harmonic Generation inside a Femtosecond Enhancement Cavity", May 20, 2005, The American Physical Society, PRL, 94, 193201.*

R. J. Jones et al., "High-repetition-rate coherent femtosecond pulse amplification with an external passive optical cavity", Dec. 1, 2004, Optical Society of America, Optics Letters, 29, 2812-2814.*

P. M. Paul, et al., "Observation of a Train of Attosecond Pulses from High Harmonic Generation", 2001, Science, 292, 1689.*

R. J. Jones et al., "Femtosecond pulse amplification by coherent addition in a passive optical cavity", Oct. 15, 2002, Optics Letters, 27 (20), 1848-1850.*

T. Brabec, et al.; "Intense few-cycle laser fields: Frontiers of nonlinear optics", Reviews of Modern Physics, vol. 72, No. 2, (Apr. 2000), pp. 545-591.

J. Seres, et al.; "Source of coherent kiloelectronvolt X-rays", Nature, vol. 433, (Feb. 10, 2005), p. 596.

V. P. Yanovsky, et al.; "Frequency doubling of 100-fs pulses with 50% efficiency by use of a resonant enhancement cavity", Optics Letters, vol. 19, No. 23 (Dec. 1, 1994) pp. 1952-1954.

M.A. Persaud, et al.; "Efficient Generation of Picosecond Pulses at 243 nm", IEEE Journal of Quantum Electronics, vol. 26, No. 7, (Jul. 1990), pp. 1253-1258.

G. McConnell, et al.; "Cavity-augmented frequency tripling of a continuous wave mode-locked laser", Journal of Physics D: Applied Physics, vol. 34, (2001), pp. 2408-2413.

T.-M. Liu, et al.; "2 GHz repetition-rate femtosecond blue sources by second harmonic generation in a resonantly enhanced cavity", Applied Physics Letters, vol. 86, (2005), pp. 061112-1 to 061112-3.

J.C. Petersen, et al.; "Short pulses in optical resonators", Optics Express, vol. 11, No. 22, (Nov. 3, 2003), pp. 2975-2981.

T.W. Hänsch, et al.; "Laser frequency stabilization by polarization spectroscopy of a reflecting reference cavity", Optics Communications, vol. 35, No. 3, (Dec. 1980), pp. 441-444.

J.L. Hall, et al.; "Laser phase and frequency stabilization using an optical resonator", Applied Physics B, vol. 31, (1983), pp. 97-105.

* cited by examiner

METHOD AND RADIATION SOURCE FOR GENERATING PULSED COHERENT RADIATION

TECHNICAL FIELD

The present invention relates to a method of generating pulsed coherent radiation in the UV and XUV wavelength ranges. Furthermore, the present invention relates to a radiation source for generating pulsed coherent radiation based on a high harmonic generation (HHG).

TECHNICAL BACKGROUND

For the generation of X-rays, several approaches are available. The conventional X-ray generation by irradiating a target with an electron beam is typically used in medicine and material science. For microscopy and lithography applications, a laser-based radiation source has been developed, which covers the wavelength range from XUV- and UV-ranges down to X-rays (see e.g. T. Brabec et al. in "Reviews of Modern Physics", vol. 72, 2000, p. 545). With these laser-based sources, an intense laser beam is focussed onto a target material, like e.g. a Xe jet. Due to a HHG process in the target material Xe, X-rays are emitted as described by e.g. J. Seres et al. in "Nature" (vol. 433, 2005, p. 596). Since the HHG process requires very high intensities ($>10^{13}$ W/cm$^2$) laser light pulses have to be amplified before being focussed onto the target material.

Techniques for pulse amplification by a coherent addition of light pulses are described e.g. in DE 197 50 320 or by R. J. Jones et al. in "Optics Letters" (vol. 29, 2004, p. 2812).

While laser sources for generating laser light pulses with a high repetition rate (MHz and higher) are available, the required amplification of the laser pulses for concentrating the laser power into a small number of ultra-short pulses per second has limited the repetition rates to a few kHz up to 100 kHz. Therefore, the HHG process can deliver HHG pulses with a relative low repetition frequency only.

To overcome this drawback of a low repetition rate, blue and UV radiation sources have been proposed, which are based on a second harmonic generation (SHG) or third harmonic generation (THG) with an optically non-linear crystal irradiated with ultra-short light pulses (see e.g. V. P. Yanovsky et al. in "Optics Letters", vol. 19, 1994, p. 1952; M. A. Persaud et al. in "IEEE Journal of Quantum Electronics", vol. 26, 1990, p. 1253; G. McConnell et al. in "Journal of Physics D: Applied Physics", vol. 34, 2001, p. 2408; and T.-M. Liu et al. in "Applied Physics Letters", vol. 86, 2005, p. 061112-1).

With these techniques, the laser light pulses are coupled into a resonant enhancement cavity including the non-linear crystal. Due to the phase-coherent addition of light pulses with the simultaneous SHG or THG process, harmonic light pulses with high repetition rates (up to GHz) can be obtained. However, the conventional generation of short wavelength radiation pulses has a drawback in terms of a limited wavelength range. As an example, M. A. Persaud et al. (see above) have described ps pulses at 243 mm. However, wavelength ranges of X- or XUV-rays have not been reached with the conventional techniques as no crystalline material is available that is transparent below 200 nm.

OBJECT OF THE INVENTION

The object of the invention is to provide an improved method for generating pulsed coherent radiation, which is capable to overcome the limitations of the conventional techniques. In particular, the method of the invention is to be capable of generating high intensity pulses in the wavelength ranges of XUV to X-rays with high repetition rates. Furthermore, the object of the invention is to provide an improved radiation source being capable to generate pulsed coherent radiation with high intensities and repetition rates in the extreme short wavelength range. In particular, short wavelength pulsed coherent radiation is to be created with a stable frequency comb characteristic.

The above objects are achieved with methods or devices comprising the features of patent claims 1 and 12. Advantageous embodiments and applications of the invention are defined in the dependent claims.

SUMMARY OF THE INVENTION

According to a first general aspect of the invention, a method of generating pulsed coherent radiation comprises a non-linear conversion of laser light pulses to high harmonic pulses in a resonant cavity including an optically non-linear medium, wherein at least the non-linear medium is arranged in an environment of reduced pressure. The laser light pulses are coupled into the resonant cavity as it is basically known from the above SHG- or THG-based techniques. The resonant cavity and a laser source creating the laser light pulses are locked to each other so that light pulses travelling in the resonant cavity continuously are increased by addition of laser light pulses coupled into the cavity. With the coherently amplified pulses, high harmonics are generated in the non-linear medium. In contrast to the conventional techniques, the high harmonic pulses are capable to leave the non-linear medium into the environment of reduced pressure. Due to the reduced pressure, the space adjacent to the non-linear medium has a high transparency for the high harmonic pulses. The inventors have found that the feature of arranging the non-linear medium both in the low pressure environment as well as in the resonant cavity does not disturb the operation of the resonant cavity. In particular, the sensitive conditions of maintaining phase-coherent amplification of laser light pulses in the resonant cavity can be maintained despite of the provision of a vacuum compartment with transparent windows in the cavity.

In the present specification, the term "resonant cavity" indicates any type of resonator being capable to be locked with an external laser light source, wherein the resonator includes at least two cavity mirrors. The term "environment of reduced pressure" indicates that the space adjacent to a high harmonic emission side of the non-linear medium has a pressure lower than atmospheric pressure. The space is evacuated, so that high harmonic pulses can be transmitted with an intensity as required for a particular application. Depending on the type of non-linear medium, a residual pressure can be present. Preferably, the non-linear medium is arranged in a vacuum.

The output spectrum of a mode-locked laser contains not just a single cw mode but a comb of such modes with frequencies $$\omega_n = n\omega_{ar} + \omega_{CE}$$

Here $\omega_r$ is the pulse repetition frequency and $\omega_{CE}$ the carrier envelope (CE) frequency. Both $\omega_r$ and $\omega_{CE}$ reside in the radio frequency domain whereas the optical frequencies of the comb are given by $\omega_n$. The two frequency regions are connected by virtue of the large integer n=$10^5$ to $10^6$ that enumerates the modes. An optical resonator for such radiation has to be simultaneously resonant for each mode $\omega_n$ that originates from the laser. This can be accomplished with a resonator of appropriate length and zero group velocity dispersion (GVD), whose CE frequency is matched to the laser (see R. J. Jones et al. in "Optics Letters" vol. 27, 2002, p. 1848-1850; and J. C. Petersen et al. in "Optics Express" vol. 11, 2003, p. 2975-2981). Locking techniques are described e.g. by T. W. Hänsch et al. in "Optics Communications" vol. 35, 1980, p. 441-444, or by R. W. P. Drever et al. in "Appl. Phys. B" vol. B 31, 1983, p. 97-105.

Generally, the high harmonic pulses can be used directly in the environment of reduced pressure, e.g. for irradiation purposes or for measurements. However, according to a preferred embodiment of the invention, the high harmonic pulses are coupled out of the resonant cavity with a beam splitting device, which is arranged in the environment of reduced pressure as well. Out-coupling of high harmonic pulses has the particular advantage of increasing the flexibility of the method according to the invention.

According to a particularly preferred embodiment of the invention, the out-coupling of the high harmonic pulses comprises a reflection on a surface of the beam splitting device arranged in the environment of reduced pressure. The beam splitting by reflection into the low pressure environment represents an essential advantage obtained by the present inventors for the first time. The out-coupling efficiency can be increased by an appropriate coating on the beam splitting device. The reflection can comprise a reflection on a solid surface or a lattice. The lattice comprises a line structure with a line distance smaller than the half main wavelength of the fundamental pulses. Accordingly, the HHG pulses can be splitted with the fine lattice without influencing the fundamental pulses. With the above conventional techniques, one of the cavity mirrors has been used for out-coupling. However, this would be impossible for out-coupling HHG pulses as a mirror material transmitting X-ray pulses or XUV-ray pulses and reflecting optical laser light pulses is not available. According to an alternative embodiment of the invention, the out-coupling of the high harmonic pulses is based on the different divergence of the fundamental pulses and the HHG pulses. Due to the shorter wavelength, the divergence of the HHG pulses is essentially lower compared with the fundamental pulses. Accordingly, the out-coupling of the high harmonic pulses can comprise a transmission trough a hole in the solid beam splitting device (e. g. trough a hole in a mirror of the cavity). The hole is arranged outside of the cavity light path for selectively transmitting the high harmonic pulses.

According to a further preferred embodiment of the invention, at least one n-th harmonic is generated with the non-linear medium, wherein n is an odd number equal or higher than 3, particularly preferred equal or higher than 5. The non-linear media have a non-crystalline (e.g. amorphous) structure with a structural mirror symmetry so that even harmonics are suppressed or completely deleted. Accordingly, with the HHG process of the invention, pulses with frequency components in a wavelength range of about 10 nm to about 200 nm can be obtained. Due to the high harmonic generation in the resonant cavity, the high harmonic pulses can be generated for the first time with a high repetition rate of in the range of 1 MHz to 1000 MHz, e.g. more than 100 MHz, which represents an e.g. 1000-fold improvement over all previous techniques.

If a portion of the laser light pulses reflected from the resonator cavity is measured and the laser pulse source for providing the laser light pulses is controlled in dependence on the measured reflected portion, further advantages in terms of optimising the lock of the laser pulse source and the resonant cavity can be obtained.

A further particular advantage of the invention is given by the high variability with regard to the provision of the non-linear medium in the low pressure environment. According to a first alternative, the complete set-up comprising the resonant cavity and the non-linear medium, possibly with the beam splitting device is provided in a vacuum chamber. According to a second alternative, the non-linear medium, possibly with the bean splitting device, is contained in a separate vacuum compartment, which is arranged in the resonant cavity. The vacuum compartment includes the non-linear medium (possibly with the beam splitting device) while the remaining resonant cavity is subjected to regular atmospheric pressure. As a further alternative, the non-linear medium (possibly with the beam splitting device) and parts of the resonant cavity can be arranged in the vacuum compartment. The inventors have found that surprisingly the adjustment of the resonant cavity is not deteriorated by windows of the vacuum compartment.

According to a second aspect, the present invention is based on the general technical teaching of providing a radiation source with a resonant cavity including a non-linear medium, which is arranged in an environment of reduced pressure. Preferably, the radiation source further includes a beam splitting device, which is arranged in or at a boundary of the environment of reduced pressure as well.

If the beam splitting device based on a reflection is arranged in the beam path of the resonant cavity with a Brewster orientation for the fundamental laser pulses in the cavity, the amplification of the laser light pulses in the resonant cavity is not reduced. Particularly preferred materials for separating the laser light pulses and the high harmonic pulses are sapphire or SiC.

If the radiation source includes a control loop for adjusting the laser pulse source and the resonant cavity relative to each other, the lock and the overall performance of the radiation source can be improved.

If a vacuum compartment containing the non-linear medium and possibly the beam splitting device is arranged in the resonant cavity, the handling and adjustment of the resonant cavity can be facilitated. The structure of the vacuum compartment is further improved if a transparent window of the vacuum compartment is used for radiation transmission (transmission of laser light pulses) and simultaneously as a beam splitting device for reflection of the high harmonic pulses.

A further important advantage of the invention is given by the broad variability in using different target materials as the non-linear medium. Any target material being capable to transmit radiation with a wavelength in the range of 10 nm to 200 nm and the fundamental wavelength is preferred. For obtaining high harmonic pulses with high intensity, target materials with low optical density in this range are used. Particularly preferred is an embodiment wherein the non-linear medium is formed as a jet or film of a liquid or gaseous target material. The jet or film generation is known from the conventional laser-based X-ray generation. In terms of low optical density, target materials selected from rare gases, e.g. Xe, or organic compounds are preferred.

If the resonant cavity of the radiation source includes at least one designed group delay dispersion mirror (chirped mirror), advantages in terms of keeping pulse compression and coherent amplification can be obtained. In particular for pulses having a duration smaller than 50 fs, the at least one chirped mirror is provided for.

Depending on the application, the radiation source of the invention can be advantageously combined with an analysing unit, into which the high harmonic pulses can be directed. As an example, the analysing unit includes a wavelength selective device, like e.g. a monochromator, for selecting a particular frequency component of the high harmonic pulses.

According to the invention, the non-linear medium is arranged in the resonant cavity, i. e. between two reflecting surfaces within the resonant cavity. Preferably, at least one of the reflecting surfaces is curved for focussing light into the non-linear medium. According to an advantageous embodiment of the invention, the resonant cavity of the radiation source includes a linear resonator with two mirrors only. According to a modified embodiment of the invention, the resonant cavity of the radiation source includes a resonator with more than two mirrors, e. g. a folded or ring-shaped resonator with 4 or more mirrors.

BRIEF DESCRIPTION OF THE DRAWINGS

Further details and advantages of the invention are described in the following with reference to the attached drawings, which show.

EMBODIMENTS OF THE INVENTION

Figure 1:
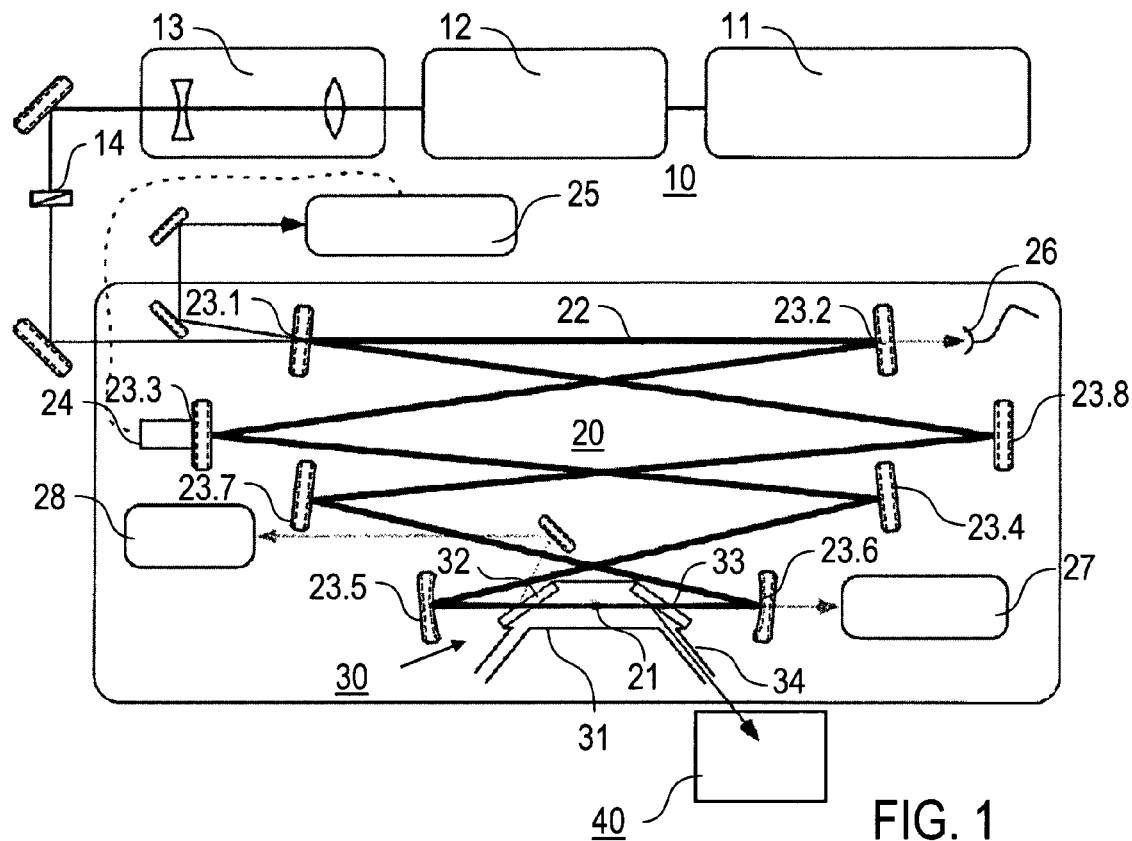
FIG. 1 a schematic illustration of the optical set-up of a radiation source according to a first embodiment of the invention.

According to a first embodiment of the invention shown in FIG. 1, a radiation source 100 for generating pulsed coherent radiation comprises a laser pulse source 10, a resonant cavity 20 and an environment 30 of reduced pressure formed by a vacuum compartment 31.

The laser pulse source 10 comprises a laser oscillator 11 for generating fs laser pulses, a pulse compressor 21 (prism compressor or comparable pulse shaping optic), that compensates the dispersion of an input mirror 23.1 of the resonant cavity 20, a telescope 13, that matches the beam diameter and focus position to the modes of the resonant cavity 20, and a λ/2 plate 14. The laser oscillator 11 is a Ti:sapphire laser (Femtolasers Femtosource 20), which delivers 20 fs pulses with 850 mW average power at a central wavelength of 800 nm and a repetition rate of 112 MHz with pulse energy of 7.7 nJ and peak power round 400 kW. The pulse compressor 21 can comprise a controllable compressor adapted for controlling the shaping of the laser light pulses. The controllable pulse compressor can be used for increasing a particular harmonic while decreasing the remaining harmonics.

The resonant cavity 20 is an enhancement resonator with a bowtie type ring cavity spanning a beam path 22 between eight mirrors 23.1 to 23.8 and including the optically non-linear medium. The cavity mirrors have the following functions. Plane input mirror 23.1 is the coupling mirror for in-coupling laser light pulses from the laser pulse source 10 into the resonator cavity 20. For optimal coupling the resonator cavity, the input mirror 23.1 has 1% transmission, so that an enhancement factor of P=100 is obtained. Plane mirror 23.3 is mounted on a piezoelectric transducer 24 for electronic control of the cavity length. The cavity length control is based on the polarization lock technique as described by T. W. Hansch et al. in "Optics Communications", vol. 35, 1980, p. 441. To this end, the piezoelectric transducer 24 is controlled with a polarization locking loop 25. Mirrors 23.2, 23.3, 23.4, 23.7 and 23.8 are plane chirped mirrors for compensation of the dispersion of air along the beam path 22 and the windows 32, 33 of the vacuum compartment 30 (see below). Mirrors 23.5 and 23.6 are spherical mirrors with 50 mm focal length, which produce a tight focus with a diameter of about 5.3 µm at the position of the optically non-linear medium within the vacuum compartment 31.

Furthermore, the resonator cavity 20 includes a pair of thin wedged fused silica plates (not shown) for manual control of the carrier envelope frequency of the laser light pulses. Advantageously, the inventors have found that no electronic feedback was necessary to control the carrier enveloped frequency of the laser pulses as the laser oscillator 11 is stable enough to operate the radiation source 100 for hours by feeding back on the cavity length only.

Phase-locking of the laser pulse source 10 and the resonant cavity 20 is obtained as described for the above conventional techniques. The power circulating in the resonant cavity 20 was measured with a photodiode 26 arranged at mirror 23.2. Furthermore, monitoring devices including an IR spectrometer 27 and an auto-correlator 28 have been provided for monitoring the laser pulses travelling in the resonator cavity 20. The power circulating in the cavity 20 has been determined to be 38 W with approximately chirp-free pulses of about 28 fs duration. The peak power is about 12 MW with intensities in the focus between mirrors 23.5, 23.6 of around $5 \cdot 10^{13}$ W/cm$^2$.

The non-linear medium is formed by a rare gas jet 21. The gas jet 21 is created in the vacuum compartment 31 arranged between the focussing mirrors 23.5, 23.6. The vacuum compartment 30 comprises a closed housing, which is connected with a vacuum pump (not shown). The housing contains an input window 32 and an output window 33, which are inclined according to the Brewster angle relative to the beam path 22. The windows 32, 33 consist of sapphire with a diameter of about 12 mm and a thickness of about 1 mm. Depending on the pressure in the vacuum compartment 31, the thickness of the windows 32, 33 can be even reduced down to 100 µm.

The rare gas jet 21 is injected into the focus of the mirrors 23.5, 23.6 using a glass capillary placed right above the focus with approximately 50 µm inner diameter and 1 bar backing pressure. As the coherently generated XUV radiation is emitted colinearly with the fundamental (laser light pulses) in a well-collimated beam parallel to the beam path 22, the exit window 33 is used as a beam splitter, that separates the laser light pulses and the high harmonic pulses. In order not to compromise the resonator finesse, the beam splitter has to have a very low loss for the laser light pulses. This can be obtained with the Brewster orientation of window 33 which yields losses smaller than $10^{-3}$ per window. Furthermore, the window 33 provides a external reflection for the XUV high harmonic pulses, which is achieved as a refractive index of sapphire in this wavelength range is lower than 1.

XUV high harmonic pulses are generated by irradiating the gas jet 21 with the laser light pulses amplified in the cavity 20. The beam of HHG pulses is extracted along an evacuated channel 34 of the vacuum compartment 31. The XUV beam is transmitted e.g. to an analysing unit 40 (schematically illustrated), which comprises e.g. a gracing incidence XuV monochromator (McPherson model 248/310G). A channeltron photodetector (BURLE CEM4751G), sensitive to wavelength smaller than 150 nm is arranged at the exit slit of the monochromator for an analysis with a photon counter (Stanford Research SR400) and a voltmeter across 1 MΩ low resistance for XuV photon flux measurements. With this arrangement, a complete photon flux of high harmonic pulses of about $0.85 \cdot 10^9$ photons per second has been measured. The spectrum measured with the monochromator includes main components in the range of 88 nm to 115 nm. A reflected portion from light pulses in the cavity can be used for controlling at least one of the laser oscillator 11 and the transducer 24 so that the output power of the HHG pulses can be optimised.

The analysing unit 40 can be arranged in an experiment compartment adjacent to the vacuum compartment, wherein a high vacuum or ultra-high vacuum can be provided in the experiment compartment. These conditions can be obtained by creating a differential vacuum even with a residual pressure in the vacuum compartment.

As the non-linear medium 21 is placed inside the resonant cavity 20, XUV radiation is produced coherently from the fundamental laser light pulses at the full repetition rate of the laser oscillator 11. The spectrum of the XUV radiation contains frequency components only that are the sum of k frequencies of the fundamental frequency comb for $k^{th}$ harmonic thereby providing a frequency comb itself. Advantageously, in contrast to the conventional HHG schemes, the power that is not converted into the XUV radiation after a single path to the non-linear medium is "recycled" in the resonant cavity 20. This portion can contribute at subsequent passes to the high harmonic generation.

Figure 2:
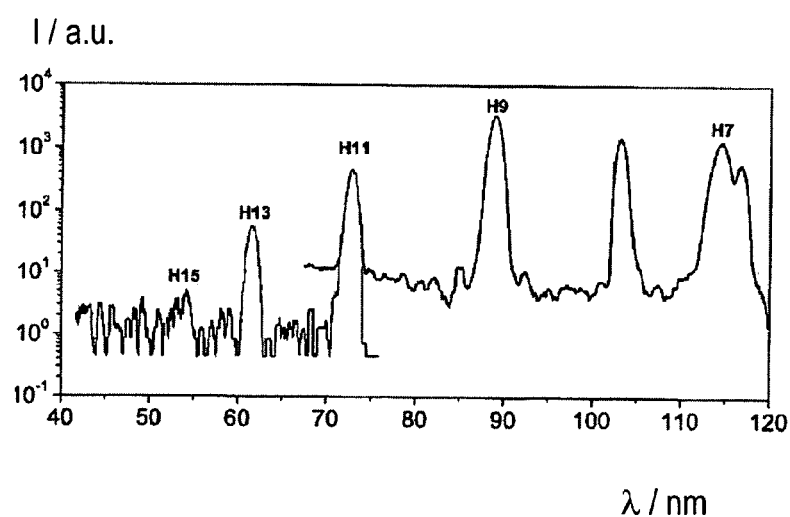
FIG. 2 experimental results obtained with the radiation source shown in FIG. 1.

FIG. 2 illustrates an XUV spectrum of high harmonic pulses generated with the arrangement of FIG. 1. High harmonics up to $15^{th}$ order (or 23 eV photon energy) have been measured. Between high harmonics of $7^{th}$ order and $9^{th}$ order, a further spectral feature has been measured. A possible explanation for this feature would be that during the pulse the Rydberg levels of the atom are Stark-shifted into eight or even nine photon resonance with the fundamental laser light. Population can accumulate there, as high-lying Rydberg states are robust against field ionisation for such short laser pulses. This longlived excited dipole can now oscillate for a relatively long time in phase even after the pulse has passed so that most of the emitted power is directed and has a frequency of the unperturbed Rydberg states just below ionisation limit.

Figure 3:
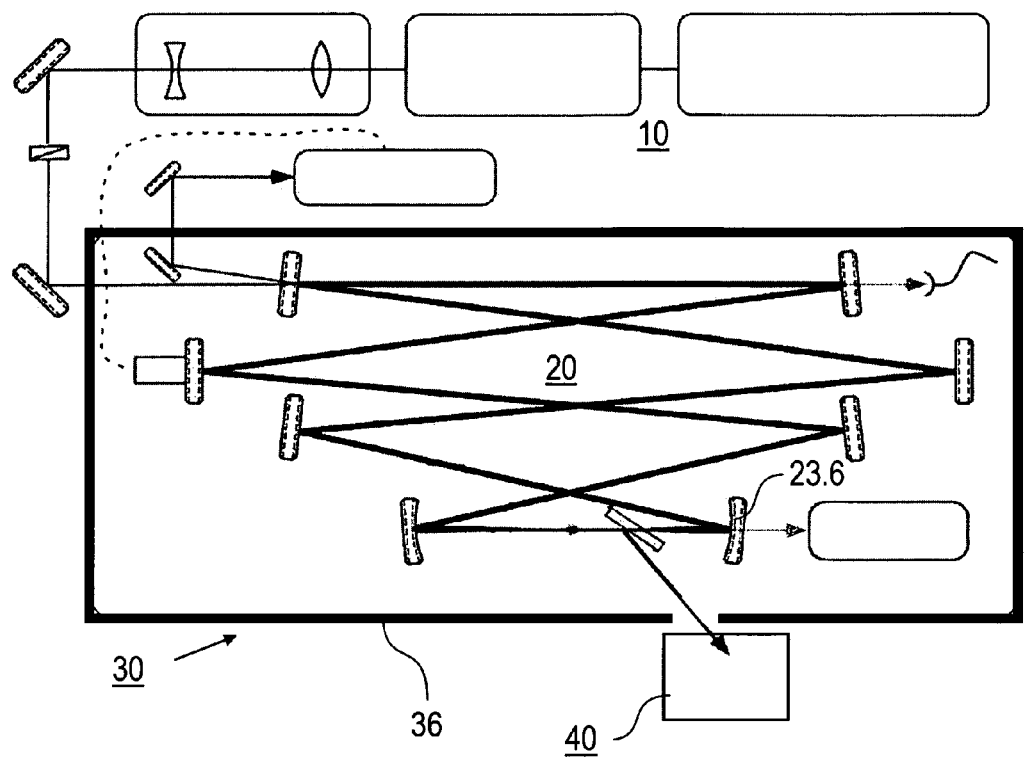
FIGS. 3 to 5 schematic representations of further embodiments of a radiation source according to the invention.
Figure 4:
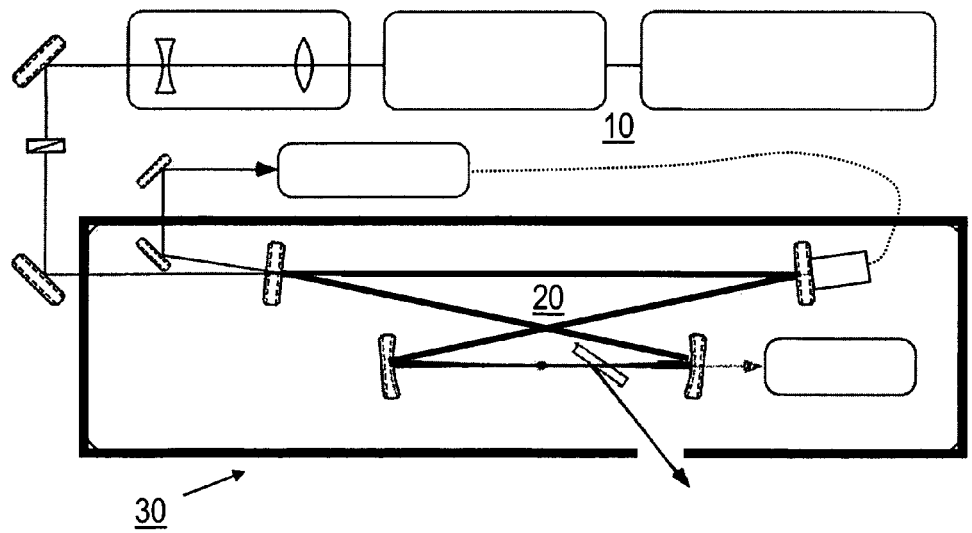

The embodiments of the radiation source 100 schematically shown in FIGS. 3 and 4 have a similar structure as the embodiment shown in FIG. 1. The essential difference is given by the type of creating the environment 30 of reduced pressure. According to FIGS. 3 and 4, the complete resonant cavity 20 is included in a vacuum chamber 36. The vacuum chamber 36 is connected with further components for measurement or irradiation purposes (details not shown). Furthermore, FIG. 4 illustrates that a 4 mirror set-up can be used as a resonator cavity 20 replacing the 8 mirror set-up of FIGS. 1 and 3.

With an alternative embodiment of the invention, e. g. mirror 23.6 shown in FIG. 3 can be used as a beam splitter, if the mirror comprises a hole outside the beam path of the resonator cavity. The hole allows the transmission of HHG pulses having another divergence compared with the laser pulses travelling in the cavity.

Figure 5:
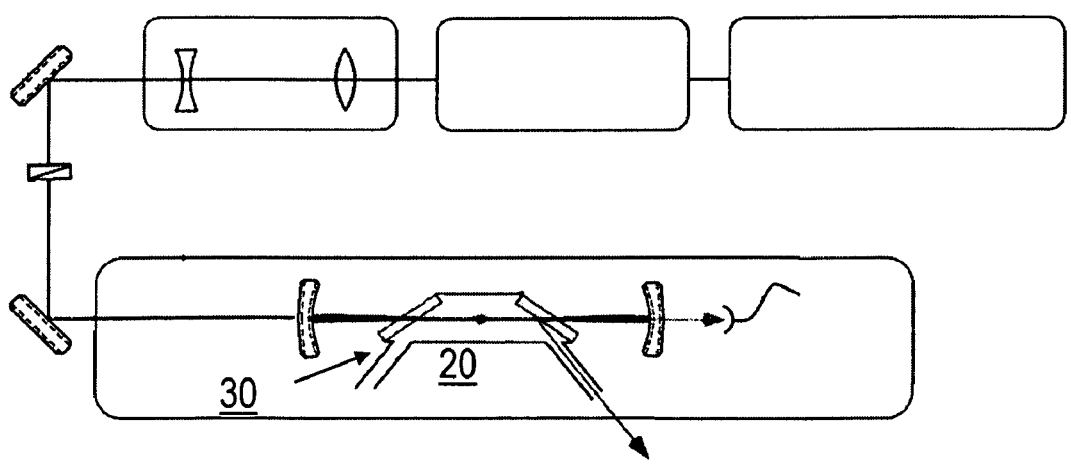

According to a further modification of the invention shown in FIG. 5, the resonant cavity 20 of the radiation source includes a linear resonator with only two mirrors with a resonant arrangement for providing the resonant cavity including the non-linear medium in the environment 30 of reduced pressure. Further components of the radiation source are structured like the above embodiments.

Preferred applications of the radiation source according to the invention are the techniques of holography, microscopy, lithography and spectroscopic measurements in the X-ray and XUV ranges. An advantage of the radiation source according to the invention is given by the fact that the presence of a frequency comb in the generated radiation allows for the first time measurements of absolute frequencies in the spectral range below 120 nm. A particular advantage is obtained if the above techniques are implemented in a vacuum environment directly connected with the environment of the non-linear medium.

The invention claimed is:

1. Method of generating pulsed coherent radiation in the wavelength ranges of XUV- to X-rays, comprising the steps of:

providing a laser source generating laser light pulses that have a repetition rate and an output spectrum comprising a fundamental frequency comb of frequency modes;

in-coupling the laser light pulses into a resonant cavity;

locking the resonant cavity and the laser source to each other so that light pulses travelling in the resonant cavity continuously are increased by coherent addition of the laser light pulses coupled into the resonant cavity; and generating high harmonic pulses by an $n^{th}$ harmonic generation interaction of the laser light pulses with a non-linear medium contained in the resonant cavity, wherein the non-linear medium is arranged in an environment of reduced pressure;

wherein a spectrum of the high harmonic pulses contains frequency components that are the sum of n frequency modes of the fundamental frequency comb for $n^{th}$ harmonic generation thereby providing a frequency comb itself; and wherein the high harmonic pulses are generated at the repetition rate of the laser light pulses generated by the laser source.

2. Method according to claim 1, wherein the step of generating high harmonic pulses comprises generating n-th harmonic pulses, with n odd natural number $n \geq 3$.

3. Method according to claim 1, wherein the step of generating high harmonic pulses comprises generating n-th harmonic pulses, with n odd natural number $n \geq 5$.

4. Method according to claim 2, wherein the high harmonic pulses are generated with a wavelength in the range of 10 nm to 260 nm.

5. Method according to claim 1, comprising the further step of: out-coupling the high harmonic pulses from the resonant cavity using a beam splitting device, wherein the beam splitting device is arranged in or at a boundary of the environment of reduced pressure.

6. Method according to claim 5, wherein the step of out-coupling the high harmonic pulses comprises a reflection on a reflecting solid surface or a lattice of the beam splitting device or a transmission through a transmitting solid surface of the beam splitting with a hole.

7. Method according to claim 1, comprising the step of adjusting the resonant cavity or a laser pulse source generating the laser light pulses in dependence on a portion of the laser light pulses reflected from the resonant cavity.

8. Method according to claim 1, wherein the resonant cavity with the non-linear medium is provided in a vacuum chamber.

9. Method according to claim 5, wherein the resonant cavity with the non-linear medium and the beam splitting device is provided in a vacuum chamber.

10. Method according to claim 1, wherein the non-linear medium is provided in a vacuum compartment, which is arranged in the resonant cavity.

11. Method according to claim 5, wherein the non-linear medium and the beam splitting device are provided in a vacuum compartment, which is arranged in the resonant cavity.

12. Radiation source of generating pulsed coherent radiation in the wavelength ranges of XUV- to X-rays, comprising:
a laser pulse source for generating laser light pulses that have a repetition rate and an output spectrum comprising a fundamental frequency comb of frequency modes; and
a resonant cavity including a non-linear medium for generating high harmonic pulses by an interaction of the laser light pulses with the non-linear medium;
the high harmonic pulses having a spectrum comprising a frequency comb that contains frequency components that are the sum of n frequency modes of the fundamental frequency comb, the high harmonic pulses being generated at the repetition rate of the laser light pulses generated by the laser pulse source;
wherein the resonant cavity and the laser source are locked to each other so that light pulses traveling in the resonant cavity continuously are increased by coherent addition of the laser light pulses coupled into the resonant cavity; and
the non-linear medium is arranged in an environment of reduced pressure.

13. Radiation source according to claim 12, further comprising: a beam splitting device for out-coupling the high harmonic pulses from the resonant cavity, wherein the beam splitting device is arranged in or at a boundary of the environment of reduced pressure.

14. Radiation source according to claim 13, wherein the beam splitting device comprises a reflecting solid surface or lattice arranged for a reflection of the high harmonic pulses, or a transmitting solid surface with a hole arranged for a transmission of the high harmonic pulses.

15. Radiation source according to claim 14, wherein the reflecting solid surface is inclined relative to a beam path in the resonant cavity with a Brewster angle for the laser light pulses.

16. Radiation source according to claim 13, wherein the beam splitting device comprises a sapphire or a SiC plate.

17. Radiation source according to claim 12, comprising a control loop for controlling the laser pulse source or the resonant cavity in dependence on a portion of the laser light pulses reflected from the resonator cavity.

18. Radiation source according to claim 12, wherein the resonant cavity with the non-linear medium is arranged in a vacuum chamber.

19. Radiation source according to claim 13, wherein the resonant cavity with the non-linear medium and the beam splitting device is arranged in a vacuum chamber.

20. Radiation source according to claim 12, wherein the non-linear medium is contained in a vacuum compartment, which is arranged in the resonant cavity.

21. Radiation source according to claim 12, wherein the beam splitting device is contained in a vacuum compartment, which is arranged in the resonant cavity.

22. Radiation source according to claim 21, wherein the beam splitting device at the same time provides a radiation transmitting window of the vacuum compartment.

23. Radiation source according to claim 12, wherein the nonlinear medium comprises a target material transmitting radiation with a wavelength in the range of 10 nm to 200 nm.

24. Radiation source according to claim 12, wherein the non-linear medium comprises a jet or film of liquid or gaseous target material.

25. Radiation source according to claim 24, wherein the target material comprises a rare gas or an organic compound.

26. Radiation source according to claim 12, wherein the resonant cavity includes at least one chirped mirror.

27. Radiation source according to claim 12, further comprising an analyzing unit for receiving the high harmonic pulses.

28. Radiation source according to claim 27, wherein the analyzing unit includes a wavelength selective device.

29. Radiation source according to claim 12, wherein the resonant cavity includes a linear resonator with two minors.

30. Radiation source according to claim 12, wherein the resonant cavity includes a resonator with more than two minors.

31. Radiation source according to claim 12, wherein the generating pulsed coherent radiation is used for precision spectroscopy.

* * * * *